US011918041B2

(12) United States Patent
Kontura et al.

(10) Patent No.: US 11,918,041 B2
(45) Date of Patent: Mar. 5, 2024

(54) HANDHELD SCOOP FOR SCRAPING AND DISPENSING PLANT MATERIAL INTO A SMOKING MEDIUM

(71) Applicants: Andrew Kontura, Brooklyn Heights, OH (US); Joshua Schmuker, Grand Rapids, MI (US)

(72) Inventors: Andrew Kontura, Brooklyn Heights, OH (US); Joshua Schmuker, Grand Rapids, MI (US)

( * ) Notice: Subject to any disclaimer, the term of this patent is extended or adjusted under 35 U.S.C. 154(b) by 745 days.

(21) Appl. No.: 17/073,965

(22) Filed: Oct. 19, 2020

(65) Prior Publication Data

US 2022/0079219 A1 Mar. 17, 2022

Related U.S. Application Data

(60) Provisional application No. 63/079,308, filed on Sep. 16, 2020.

(51) Int. Cl.
*A24F 23/04* (2006.01)
*B25B 33/00* (2006.01)
*B25G 1/10* (2006.01)

(52) U.S. Cl.
CPC .............. *A24F 23/04* (2013.01); *B25B 33/00* (2013.01); *B25G 1/102* (2013.01)

(58) Field of Classification Search
CPC .. A24F 23/04; A24F 1/26; A47F 13/08; A47L 13/52; A24C 5/42; G01F 19/002
USPC .................................................. 294/176, 180
See application file for complete search history.

(56) References Cited

U.S. PATENT DOCUMENTS

| | | | | |
|---|---|---|---|---|
| 626,096 | A * | 5/1899 | Rice | |
| 715,756 | A * | 12/1902 | Clover | |
| 834,770 | A * | 10/1906 | Steele | |
| 2,617,281 | A * | 11/1952 | Jones | A47L 13/52 15/257.3 |
| 3,371,694 | A * | 3/1968 | Miller | A47J 47/005 D7/698 |
| D361,403 | S | 8/1995 | Yarbrough et al. | |
| 6,249,930 | B1 * | 6/2001 | Noggle | A47L 13/52 15/257.1 |
| 6,477,733 | B1 * | 11/2002 | Kuhns | A47L 13/52 15/257.3 |
| 6,733,056 | B2 * | 5/2004 | Daniele | A47J 43/28 30/169 |

(Continued)

*Primary Examiner* — Dean J Kramer
(74) *Attorney, Agent, or Firm* — Jenei LLC; Stephen R. Jenei

(57) ABSTRACT

A scoop including a tray and a gripping portion. The tray including a bottom portion having a flat bottom surface and an inclined top surface that distally terminate in a straight beveled edge that has a width that is smaller than a smoking outer wrap. The inclined top surface proximally transitions to a transverse channel having a backstop portion and top panel portion. The transverse channel at least partially open on one lateral end. The gripping portion is attached to, and extending proximally from, the tray enabling a user to: (i) position the straight beveled edge against a surface for scraping smoking material onto the tray; (ii) upwardly tip the trap to collect the scraped smoking material into the transverse channel; and (iii) to selectively dispense the collected smoking material either through the at least partially open lateral end of the transverse channel or back over the straight beveled edge.

11 Claims, 17 Drawing Sheets

(56) References Cited

U.S. PATENT DOCUMENTS

| | | | |
|---|---|---|---|
| 8,408,390 B2 | | 4/2013 | Rennecamp |
| D718,993 S | * | 12/2014 | Mak ................................ D8/10 |
| D797,370 S | | 9/2017 | Kesselman et al. |
| 2005/0150083 A1 | * | 7/2005 | Roberts .................. B25G 1/102 16/430 |
| 2016/0158803 A1 | | 6/2016 | Rosado |
| 2018/0064165 A1 | | 3/2018 | Mott et al. |
| 2019/0297936 A1 | | 10/2019 | Kang et al. |
| 2019/0328037 A1 | | 10/2019 | Kesselman et al. |
| 2020/0170293 A1 | | 6/2020 | Kesselman et al. |
| 2020/0187717 A1 | | 6/2020 | Pagan |
| 2020/0333173 A1 | | 10/2020 | Lundgren-Goodman et al. |

* cited by examiner

HANDHELD SCOOP FOR SCRAPING AND DISPENSING PLANT MATERIAL INTO A SMOKING MEDIUM

CLAIM OF PRIORITY UNDER 35 U.S.C. § 119

The present application for patent claims priority to Provisional Application No. 63/079,308 entitled "HANDHELD SCOOP FOR SCRAPING AND DISPENSING PLANT MATERIAL INTO A SMOKING MEDIUM," filed Sep. 16, 2020, and assigned to the assignee hereof and hereby expressly incorporated by reference herein.

FIELD OF THE INVENTION

The present disclosure generally relates to hand tools, and more particularly to handheld scoops.

BACKGROUND OF THE INVENTION

Smokers can purchase loose smoking tobacco in a pouch or box. The smoker pinches portions of the loose tobacco to fill a cigarette paper, a blunt wrapper, a cigar shell or a pipe Generally, the tobacco is dry and does not leave any appreciable residue on the fingers. More recently, some smokers purchase loose marijuana for smoking using similar conveyances. Typically, the loose marijuana plant material is not desiccated but has an excessive amounts of resins that stick to fingers. Having to handle the marijuana transfer the resins to the fingers. The stickiness of the resin impairs the user's ability to smoothly roll a paper or cigar shell. The resin on the user's fingers sticks to the paper or shell, creating tears, holes, uneven rolling, and poor final outcome. Even washing hands between the steps of filling the paper/cigar shell and rolling a marijuana blunt is difficult. The resin from marijuana is too sticky basic for hand soap to efficiently clean the fingers of all resins. Often an industrial grade soap is required to thoroughly clean fingers and eliminate any remaining resin.

To minimize touching the marijuana, users often employ a stiff, small card such as a plastic credit card or a laminated identification card. The stiff straight edge and surface area of the card enables the user to a degree to scrape and dispense marijuana into the paper, cigar shell, or blunt wrap. However, the size of such cards is too small to carry the needed amount of marijuana and the flat surface tends to lose some of the contents if inadvertently tipped or subjected to even small amounts of breeze. In addition, some users do not have the dexterity and strength in their fingertips that is sufficient for properly using a small card for this purpose.

SUMMARY OF THE INVENTION

In one aspect, the present disclosure provides a scoop that includes a tray and a gripping portion. The tray including a bottom portion having a flat bottom surface and an inclined top surface that distally terminate in a straight beveled edge that has a width that is smaller than a smoking outer wrap. The inclined top surface proximally transitions to a transverse channel having a backstop portion and top panel portion. The transverse channel at least partially open on one lateral end. The gripping portion is attached to, and extending proximally from, the tray. The gripping portion enables a user to: (i) position the straight beveled edge against a surface for scraping smoking material onto the tray; (ii) upwardly tip the trap to collect the scraped smoking material into the transverse channel; and (iii) to selectively dispense the collected smoking material either through the at least partially open lateral end of the transverse channel or back over the straight beveled edge.

In another aspect, the present disclosure provides a scoop including a tray and a gripping portion. The tray includes a bottom portion having a flat bottom surface and an inclined top surface that distally terminate in a straight beveled edge that has a width that is smaller than a smoking outer wrap. The inclined top surface proximally transitions to a top portion of the tray that includes a transverse channel. The transverse channel has a backstop portion. The transverse channel is closed on each lateral end. The gripping portion is attached to, and extending proximally from, the tray. The gripping portion enables a user to: (i) position the straight beveled edge against a surface for scraping smoking material onto the tray; (ii) upwardly tip the trap to collect the scraped smoking material into the transverse channel; and (iii) to dispense the collected smoking material back over the straight beveled edge.

In an additional aspect, the present disclosure provides a scoop including a tray and a gripping portion. The tray includes a bottom portion having a flat bottom surface and an inclined top surface that distally terminate in a straight beveled edge that has a width that is smaller than a smoking outer wrap. The inclined top surface proximally transitions to a top portion of the tray that includes a backstop portion. The gripping portion is attached to, and extending proximally from, the tray. The gripping portion enables a user to: (i) position the straight beveled edge against a surface for scraping smoking material onto the tray; (ii) upwardly tip the trap to collect the scraped smoking material into the transverse channel; and (iii) to selectively dispense the collected smoking material either off of a selected lateral side or back over the straight beveled edge.

In one embodiment, the present invention comprises a tool in the form of a unitary scoop for the scooping and transferring of a ground material such as an herb from one container or device to another. It is noted that the tool may be used for handling a variety of materials and that material such as a ground herb is just an example. Thus, the use of the term "herb" herein is used for ease of description only and is to be broadly interpreted to mean any material which a user may desire to use the tool to handle. In a first aspect, the tool eliminates the need to touch the herbs directly with the user's hands or fingers. In another aspect, the tool is ergonomically designed for easy retrieval, transport and dispensing of the material, with less mess and waste than the traditional finger pinch method and prior art tools.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1A:
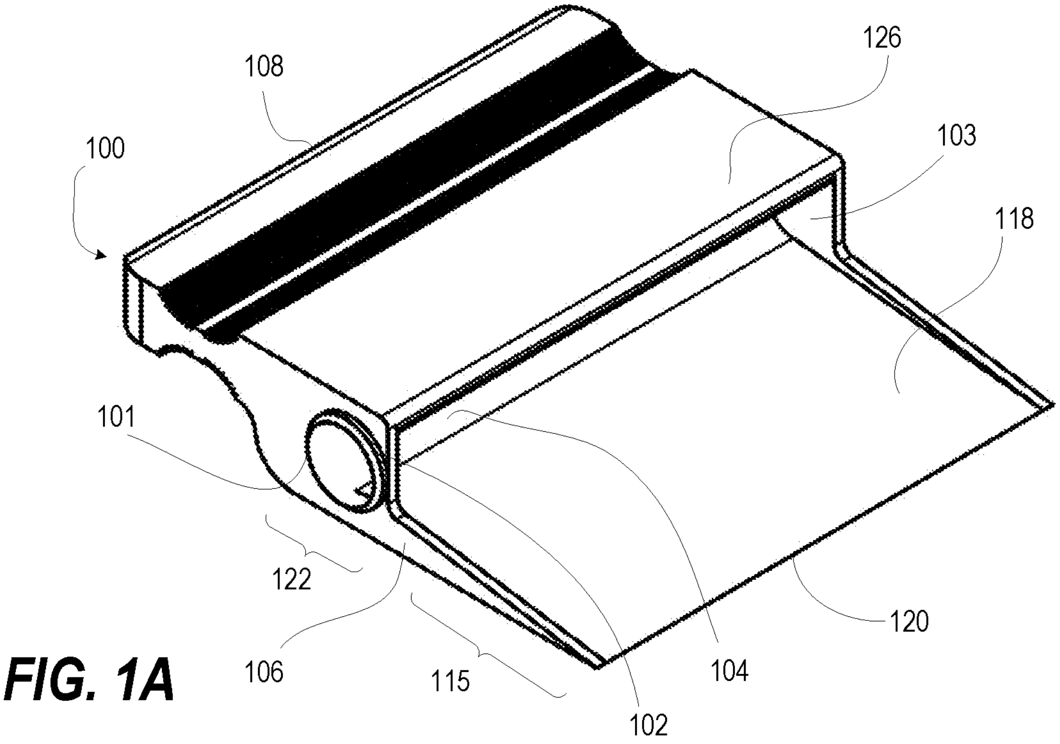
FIG. 1A illustrates a three-dimensional view of a first example scoop having a funnel lateral opening, according to one or more embodiments.

In one or more embodiments, the present provides a scoop with an incline leading up to a 0.5-inch radius with a top that resembles a half pipe with an additional handle designed for maximum grip while using the product. Other embodiments described herein have a 0.44-inch radius or an 0.88-inch radius channel or half-pipe design. The scoop eliminates the need to use phalanges, credit cards, driver license cards, etc., to scoop up marijuana/herbs. The scoop increased grip for better control with transporting marijuana/herbs into smoking medium such as cigar shells, papers, rolling machines, pipes, etc. The scoop is a multifunctional tool regarding putting marijuana into a smoking medium. The scoop allows you to swiftly scoop up the desired amount in one motion and has the ability to either slide or pour the marijuana into the preferred smoking medium. In one or more embodiments, the scoop incorporates a size, an incline, for sliding and picking up, the half inch radius for pouring into medium and the handle that are directly suited to this use.

In one or more embodiments, the smoker scoop 100 can be used for gathering and dispensing a number of plants that are smoked: *Althaea officinalis* ("Marshmallow"); *Amaranthus dubius; Arctostaphylos uva-ursi* ("Bearberry"); *Argemone mexicana; Arnica; Artemisia vulgaris* ("Mugwort"); Asteraceae species ("Chamomile"); Cabbage~*Brassica Oleracea; Calea zacatechichi; Canavalia maritima* ("Baybean"); *Cannabis* (Tetrahydrocannabinol (THC) and Cannabidiol (CBD)); *Cecropia mexicana* ("Guamura"); *Cestrum nocturnum* ("Hasana"); *Cynoglossum virginianum* L. ("Wild comfrey"); *Cytisus scoparius*; Damiana; *Entada rheedii; Eschscholzia californica*~"California Poppy"); *Fittonia albivenis; Hippobroma longiflora; Humulus japonica* ("Japanese Hops"); *Humulus lupulus* ("Hops"); *Lavandula* species ("Lavender"); *Lactuca virosa* ("Lettuce Opium"); *Laggera alata*; Lamiaceae species ("Mint"); *Leonotis leonurus* ("Lion's tail" or "Wild dagga"); *Leonurus cardiaca* ("Motherwort"); *Leonurus sibiricus* ("Honeyweed"); *Lobelia cardinalis; Lobelia inflata* ("Indian-tobacco"; *Lobelia inflata; Lobelia siphilitica; Nepeta cataria* ("Catnip"); *Nicotiana* species ("Tobacco"); *Nymphaea alba* ("White Lily"); *Nymphaea caerulea* ("Blue Lily"); Opium poppy; *Origanum majorana* ("Marjoram"); *Origanum vulgare* ("Oregano"); *Passiflora incarnata* ("Passionflower"); *Pedicularis densiflora* ("Indian Warrior"); *Pedicularis groenlandica* ("Elephant's Head"); Red raspberry leaf; *Rubus occidentalis; Salvia divinorum; Salvia dorrii* ("Tobacco Sage"); *Salvia* species ("Sage"); *Scutellaria galericulata; Scutellaria lateriflora; Scutellaria nana; Scutellaria* species ("Skullcap"); *Sida acuta* ("Wireweed"); *Sida rhombifolia* ("Wireweed"); *Silene capensis; Syzygium aromaticum* ("Clove"); *Tagetes lucida* ("Mexican Tarragon"); *Tarchonanthus camphoratus; Turnera diffusa* ("Damiana"); *Tussilago farfara* ("Coltsfoot"); *Verbascum* species ("Mullein"); and *Zornia latifolia* ("Maconha Brava").

Figure 1B:
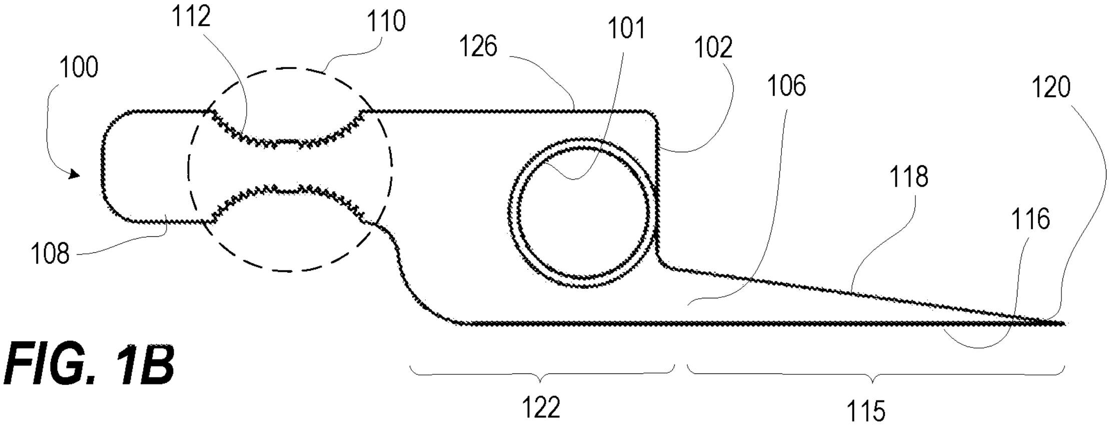
FIG. 1B illustrates a right-side view of the first example scoop of FIG. 1A, according to one or more embodiments.
Figure 1C:
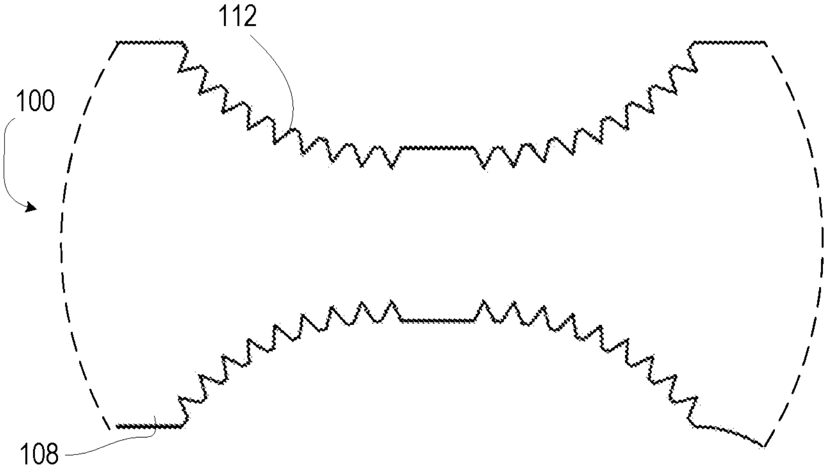
FIG. 1C illustrates a right-side detail view of a gripping portion of the first example scoop of FIG. 1B, according to one or more embodiments.
Figure 1D:
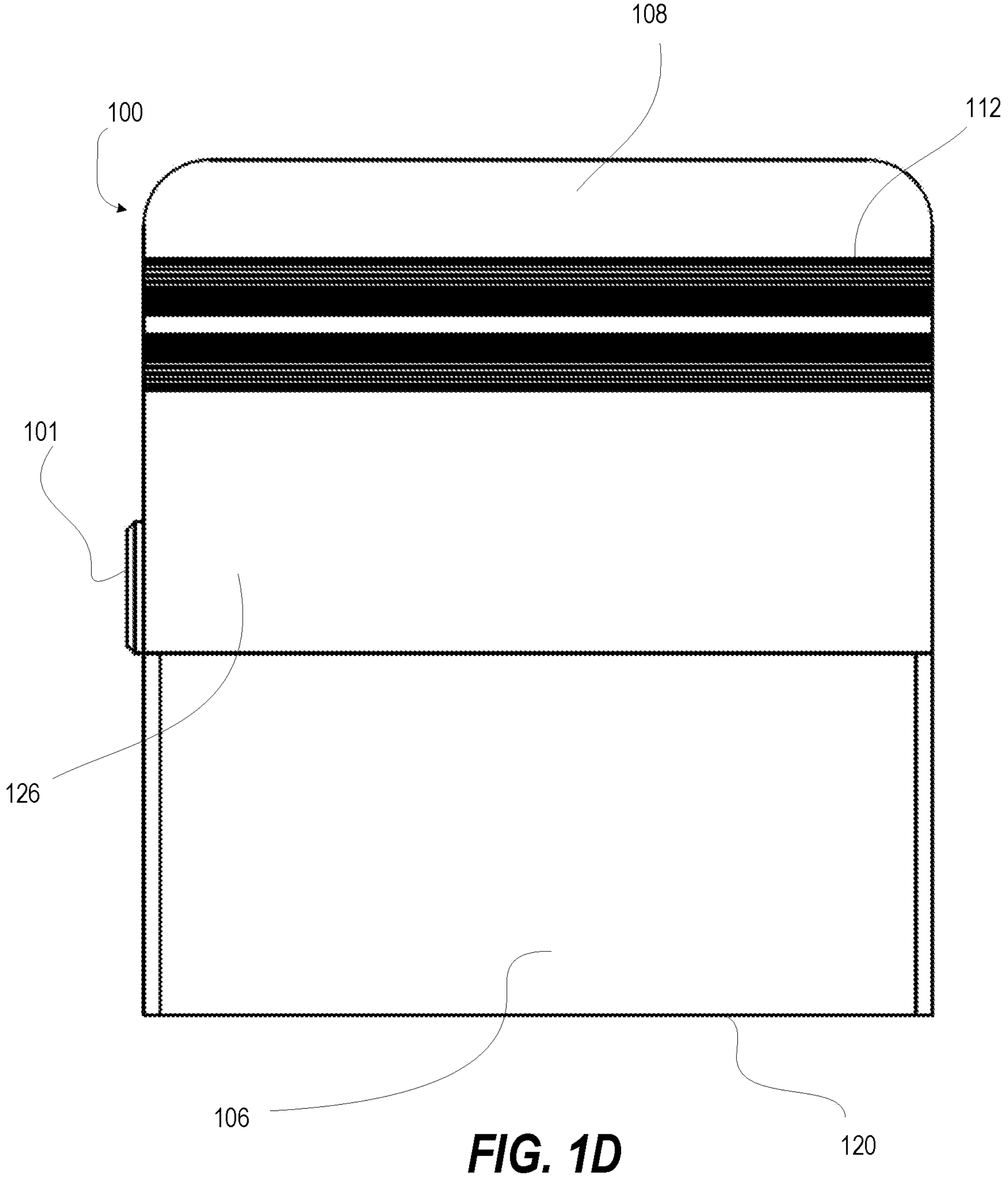
FIG. 1D illustrates a top view of the first example scoop of FIG. 1A, according to one or more embodiments.
Figure 1E:
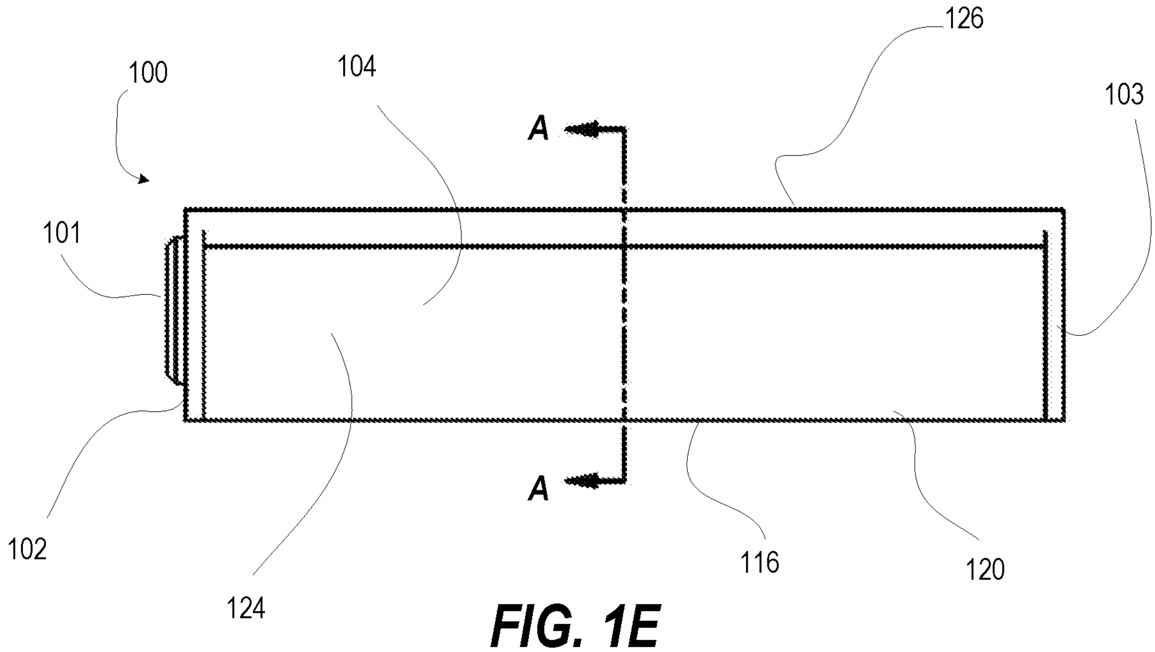
FIG. 1E illustrates a front view of the first example scoop of FIG. 1A, according to one or more embodiments.
Figure 1F:
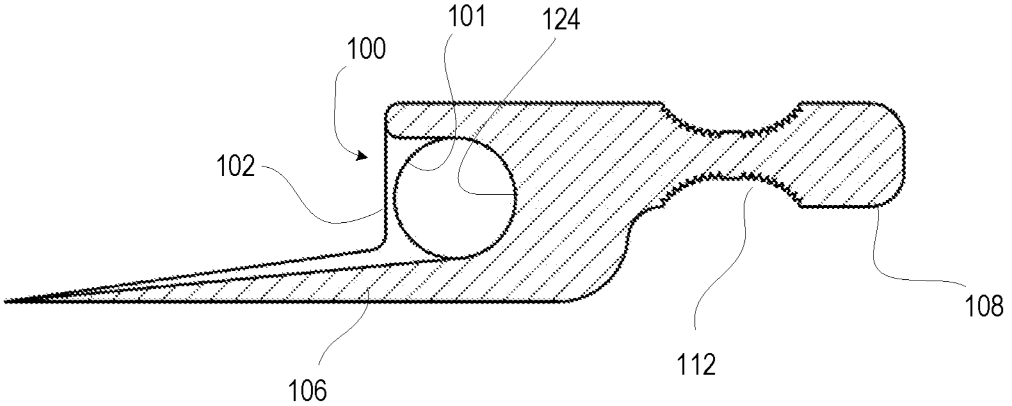
FIG. 1F illustrates a left-side view of the first example scoop of FIG. 1E cutaway along lines A-A, according to one or more embodiments.

Turning to the Drawings, FIG. 1A illustrates a three-dimensional view of a first example scoop 100 having a funnel lateral opening 101 in an open lateral side 102 and a closed lateral side 103 of a transverse channel ("half-pipe") 104 of radius 0.50 inch. The transverse channel 104 receives plant material via a tray 106 that is manipulated by gripping portion 108. FIG. 1B illustrates a right-side view of the first example scoop 100. FIG. 1C illustrates a right-side detail view at 110 of a finger recess 112 formed in the gripping portion 108 of the first example scoop 100. FIG. 1D illustrates a top view of the first example scoop 100. FIG. 1E illustrates a front view of the first example scoop 100. FIG. 1F illustrates a left-side view of the first example scoop 100 cutaway along lines A-A. For clarity, the funnel lateral opening 101 can be on either or both of a right side and a left side of the transverse channel 104.

With particular reference to FIG. 1A, the tray 106 of the first example scoop 100 includes a bottom portion 115 having a flat bottom surface 116 (FIG. 1B) and an inclined top surface 118 that distally terminate in a straight beveled edge 120 that has a width that is smaller than a smoking outer wrap. In one or more embodiments, straight beveled edge 120 is 3.00 inches wide as depicted. In other embodiments, a straight beveled edge can be larger, such as 4.00 inches. The inclined top surface 118 proximally transitioning to a top portion 122 comprising a transverse channel 104 ("half-pipe"). The transverse channel having a backstop portion 124 (FIG. 1F) and a top panel portion 126. In at least one or more embodiments, the transverse channel 104 at least partially open on one lateral end, which in this is instance is via funnel lateral opening 101. The gripping portion 108 is attached to, and extending proximally from, the tray 106. The gripping portion 108 enabling a user to: (i) position the straight beveled edge 120 against a surface for scraping smoking material onto the tray 106; (ii) upwardly tip the trap 106 to collect the scraped smoking material into the transverse channel 104; and (iii) to selectively dispense the collected smoking material either through the at least partially open lateral end (funnel lateral opening 101) of the transverse channel 104 or back over the straight beveled edge 120. The former can dispense into a small opening such as a smoking pipe. The latter can dispense evenly into smoking wrapper or shell.

Marijuana materials often still contain a good deal of resin from their trichomes. This resin (terpenes or essential oil) gives marijuana a sticky consistency that makes removal from a surface difficult. In one or more embodiments, the straight beveled edge 120 of the inclined top surface 118 are advantageously configured to scrape against surfaces when, for instance, it is desired to pick up material that is clinging to such surface. In one or more embodiments, the surfaces of the scoop are coated with one or more nonstick coatings such as polytetrafluoroethylene (PTFE) or ceramic coatings.

In one or more embodiments, the scoop 100 may provide the ability to measure single servings of predetermined quantities of a smoking material. In another embodiment, the scoop 100 may be provided in a set of two or more scoops of predetermined volumes.

Figure 2A:
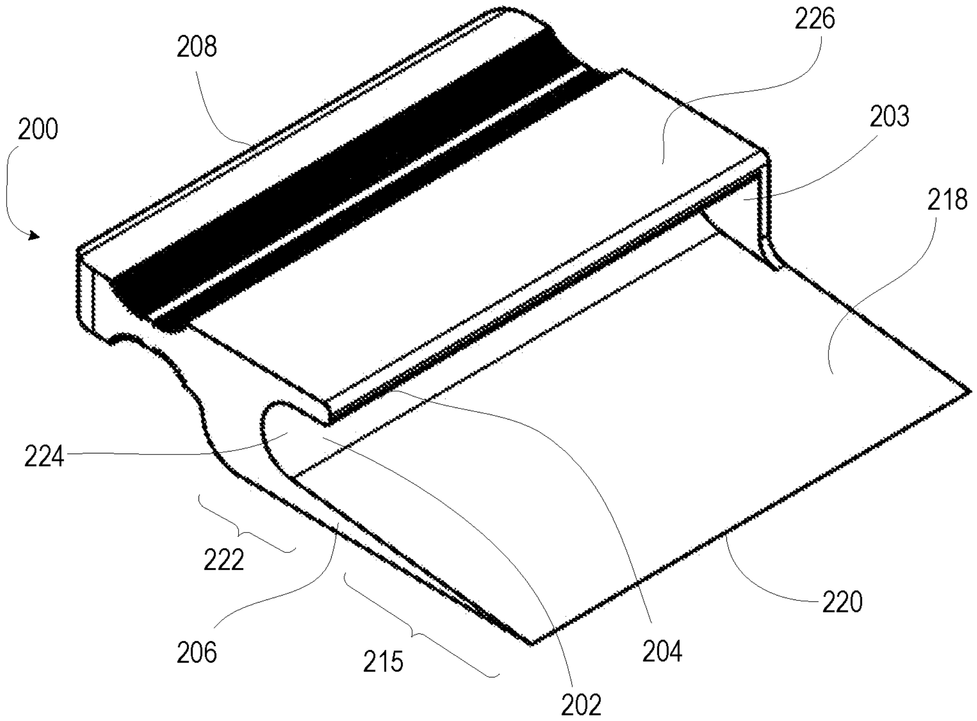
FIG. 2A illustrates a three-dimensional view of a second example scoop having one lateral opening, according to one or more embodiments.
Figure 2B:
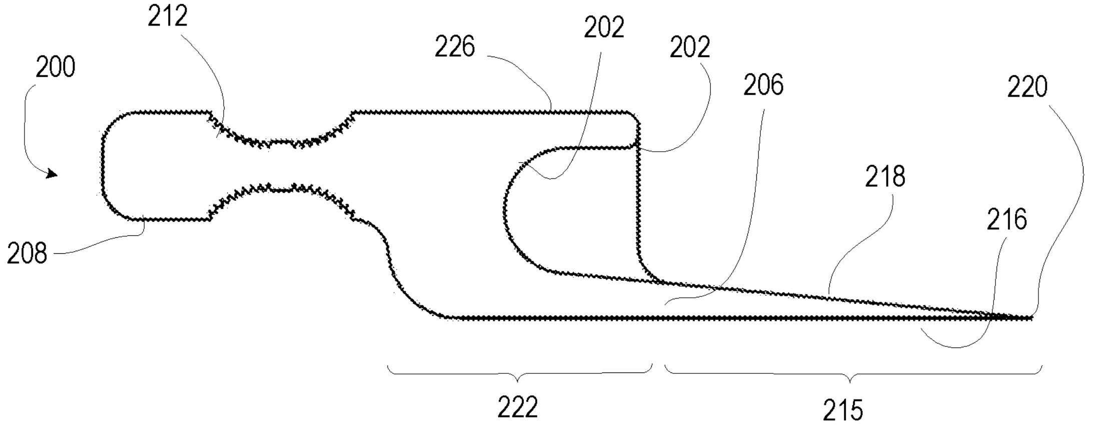
FIG. 2B illustrates a right-side view of the second example scoop of FIG. 2A, according to one or more embodiments.
Figure 2C:
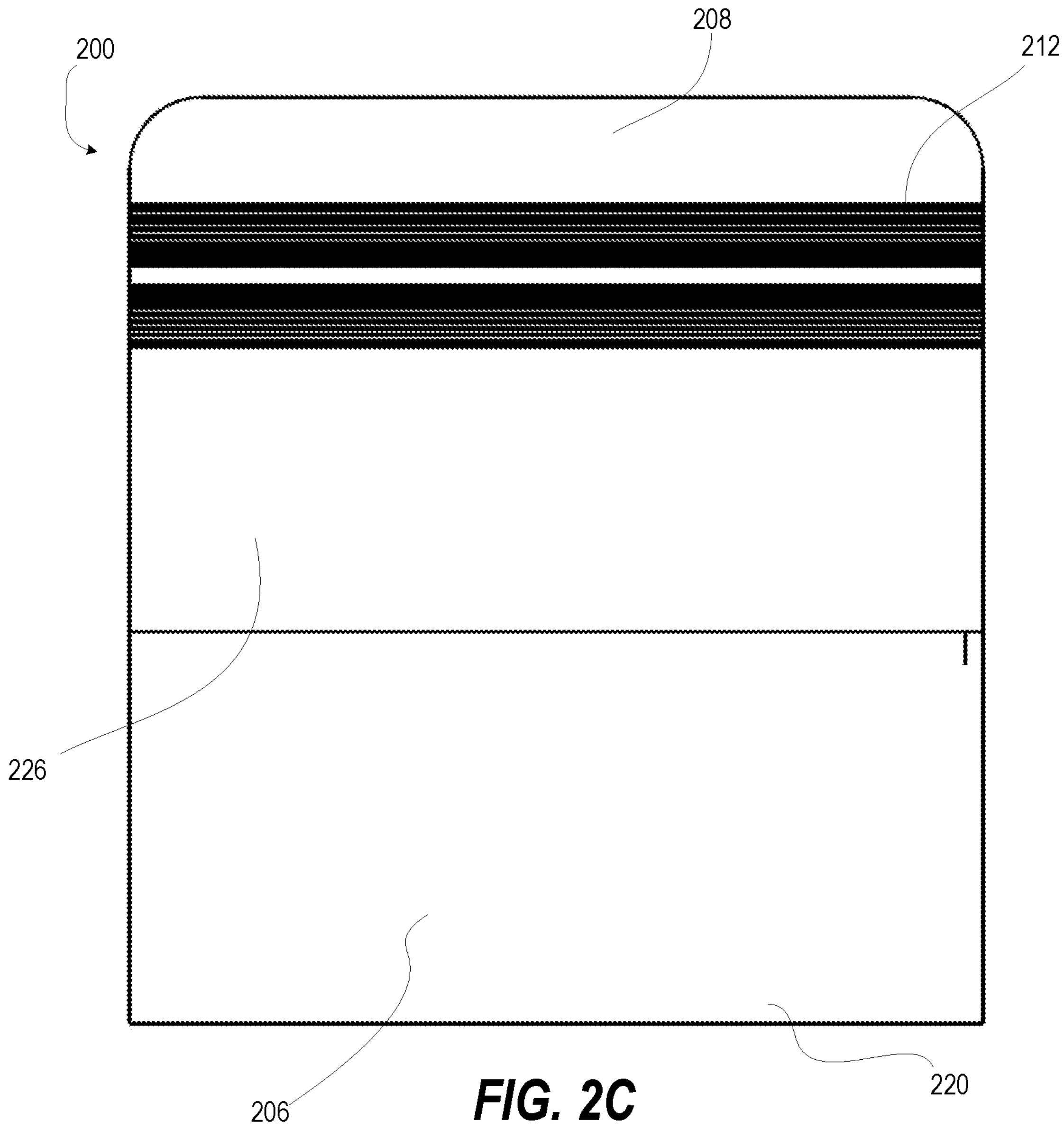
FIG. 2C illustrates a top view of the second example scoop of FIG. 2A, according to one or more embodiments.
Figure 2D:
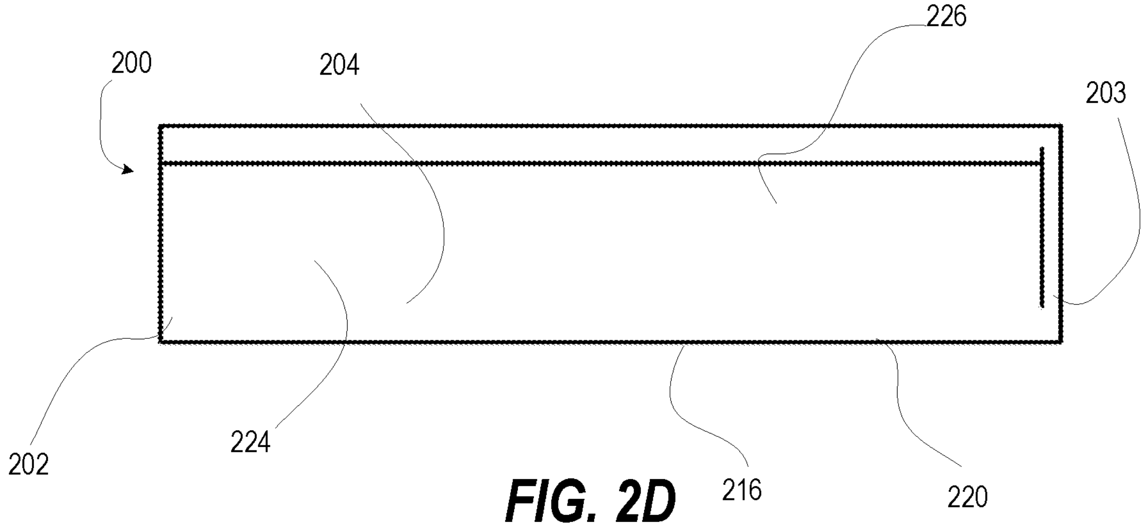
FIG. 2D illustrates a front view of the second example scoop of FIG. 2A, according to one or more embodiments.

FIG. 2A illustrates a three-dimensional view of a second example scoop 200 having one lateral opening 202 and one closed lateral side 203 of a transverse channel ("half-pipe") 204 of radius 0.50 inch. FIG. 2B illustrates a right-side view of the second example scoop 200. FIG. 2C illustrates a top view of the second example scoop 200. FIG. 2D illustrates a front view of the second example scoop 200. For clarity, the lateral opening 202 can be on either or both of a right side and a left side of the transverse channel 204.

With particular reference to FIG. 2A, the tray 206 of the first example scoop 200 includes a bottom portion 215 having a flat bottom surface 216 (FIG. 2B) and an inclined top surface 218 that distally terminate in a straight beveled edge 220 that has a width that is smaller than a smoking outer wrap. In one or more embodiments, straight beveled edge 220 is 3.00 inches wide as depicted. In other embodiments, a straight beveled edge can be larger, such as 4.00 inches. The inclined top surface 218 proximally transitioning to a top portion 222 comprising a transverse channel 204 ("half-pipe"). The transverse channel having a backstop portion 224 and a top panel portion 226. In at least one or more embodiments, the transverse channel 204 at least partially open on one lateral end. In one or more embodiments, the lateral opening 102 is defined by lateral edges of transverse channel 204. The gripping portion 208 is attached to, and extending proximally from, the tray 206. The gripping portion 208 enabling a user to: (i) position the straight beveled edge 220 against a surface for scraping smoking material onto the tray 206; (ii) upwardly tip the trap 206 to collect the scraped smoking material into the transverse channel 204; and (iii) to selectively dispense the collected smoking material either through the lateral opening 202 of the transverse channel 204 or back over the straight beveled edge 220. The former can dispense into a small opening such as a smoking pipe. The latter can dispense evenly into smoking wrapper or shell.

In one or more embodiments, the scoop 200 may comprise measuring or volume markings on one or more surface. In particular, the markings can be present on one or more surfaces of the scoop in order to assist the user in visually determining the quantity of material present in the transverse channel. One skilled in the art will appreciate that the markings can alternatively be provided any suitable location either on the flat bottom surface 216 and/or the inclined top surface 218.

Figure 3A:
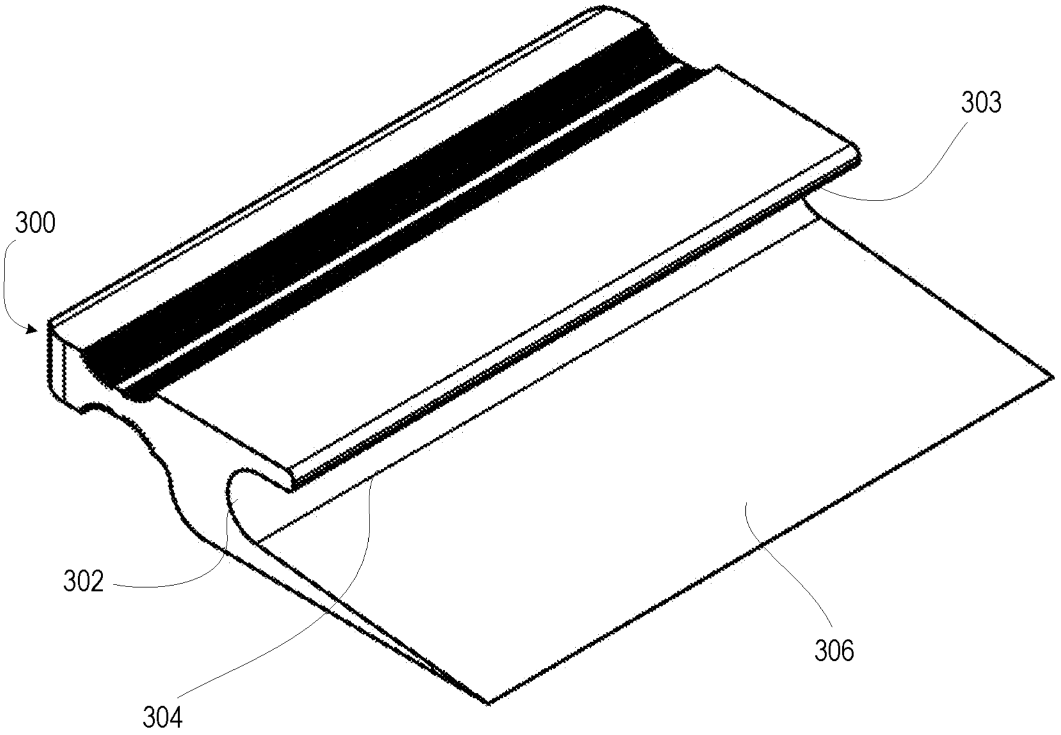
FIG. 3A illustrates a three-dimensional view of a third example scoop having a laterally open transverse channel ("half-pipe") with a smaller radius, according to one or more embodiments.
Figure 3B:
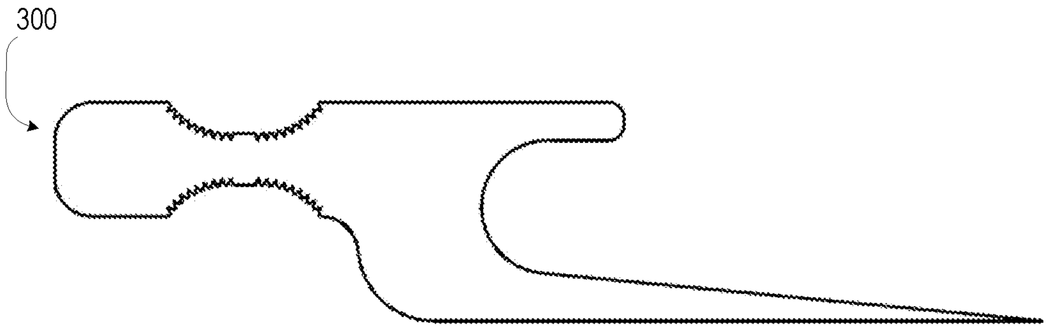
FIG. 3B illustrates a right-side view of the third example scoop of FIG. 3A, according to one or more embodiments.
Figure 3C:
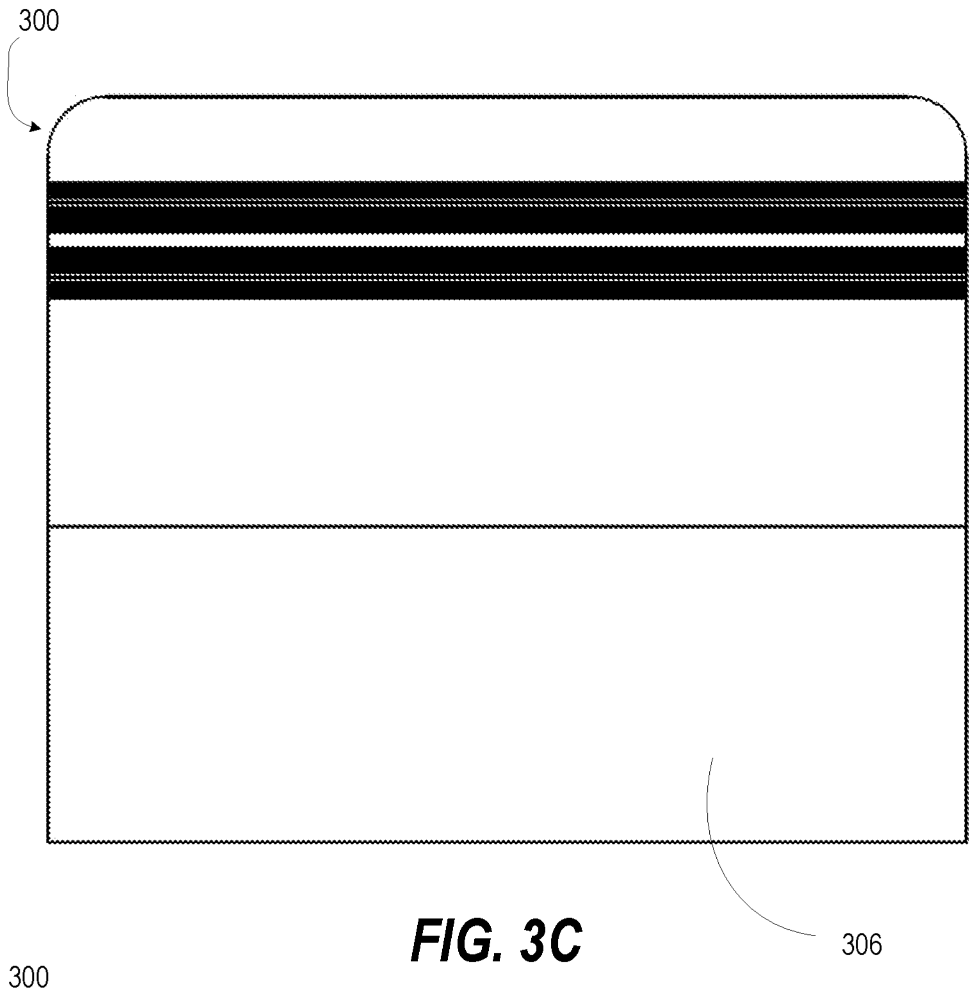
FIG. 3C illustrates a top view of the third example scoop of FIG. 3A, according to one or more embodiments.
Figure 3D:
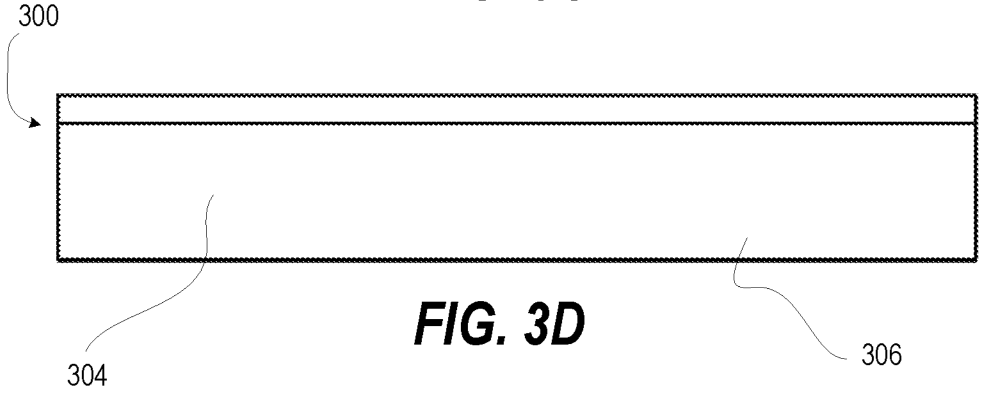
FIG. 3D illustrates a front view of the third example scoop of FIG. 3A, according to one or more embodiments.

FIG. 3A illustrates a three-dimensional view of a third example scoop 300 having right and left laterally openings 302, 303 of a transverse channel ("half-pipe") 304 with a smaller radius of 0.44 inch and a tray 306 having a larger width 4.0 inches. Top portion 322 of the tray 306 includes a top plate portion 326. FIG. 3B illustrates a right-side view of the third example scoop 300. FIG. 3C illustrates a top view of the third example scoop 300. FIG. 3D illustrates a front view of the third example scoop 300. Except for the change in dimensions and having a left lateral opening 303, third example scoop 300 is similar to second scoop 200 (FIGS. 2A-2E).

Figure 4A:
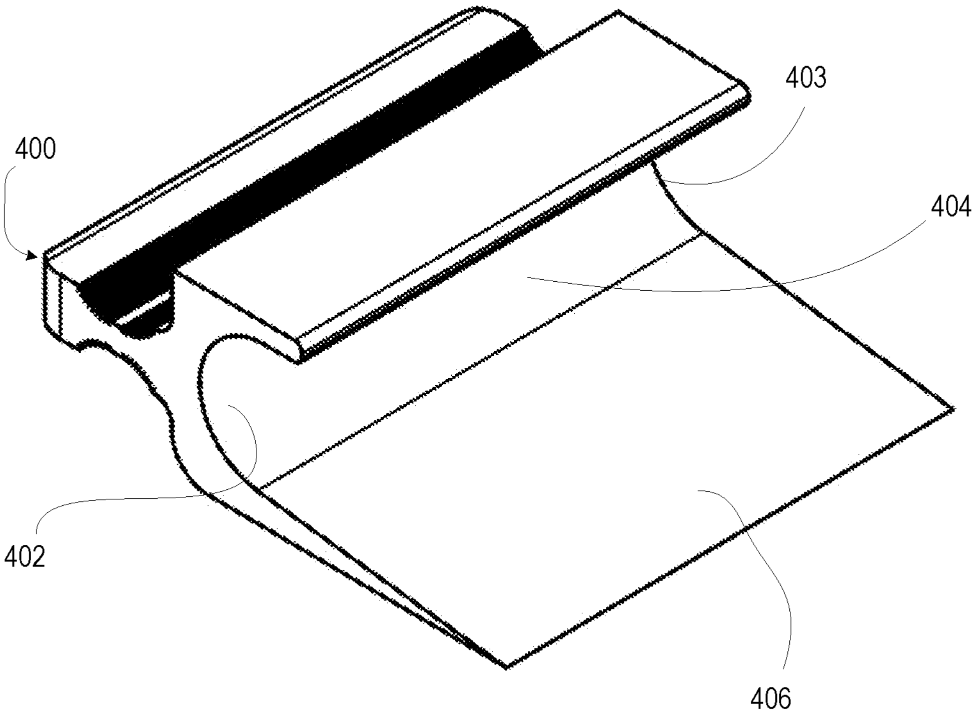
FIG. 4A illustrates a three-dimensional view of a fourth example scoop having a laterally open transverse channel ("half-pipe") with a larger radius, according to one or more embodiments.
Figure 4B:
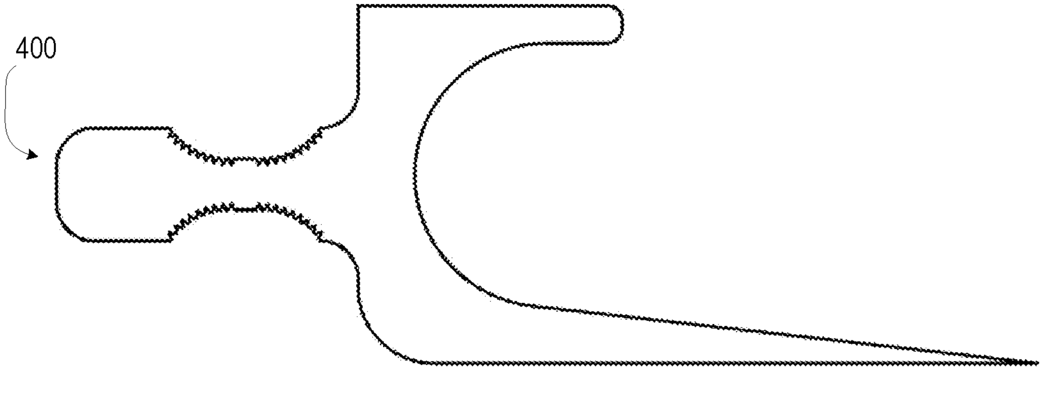
FIG. 4B illustrates a right-side view of the fourth example scoop of FIG. 4A, according to one or more embodiments.
Figure 4C:
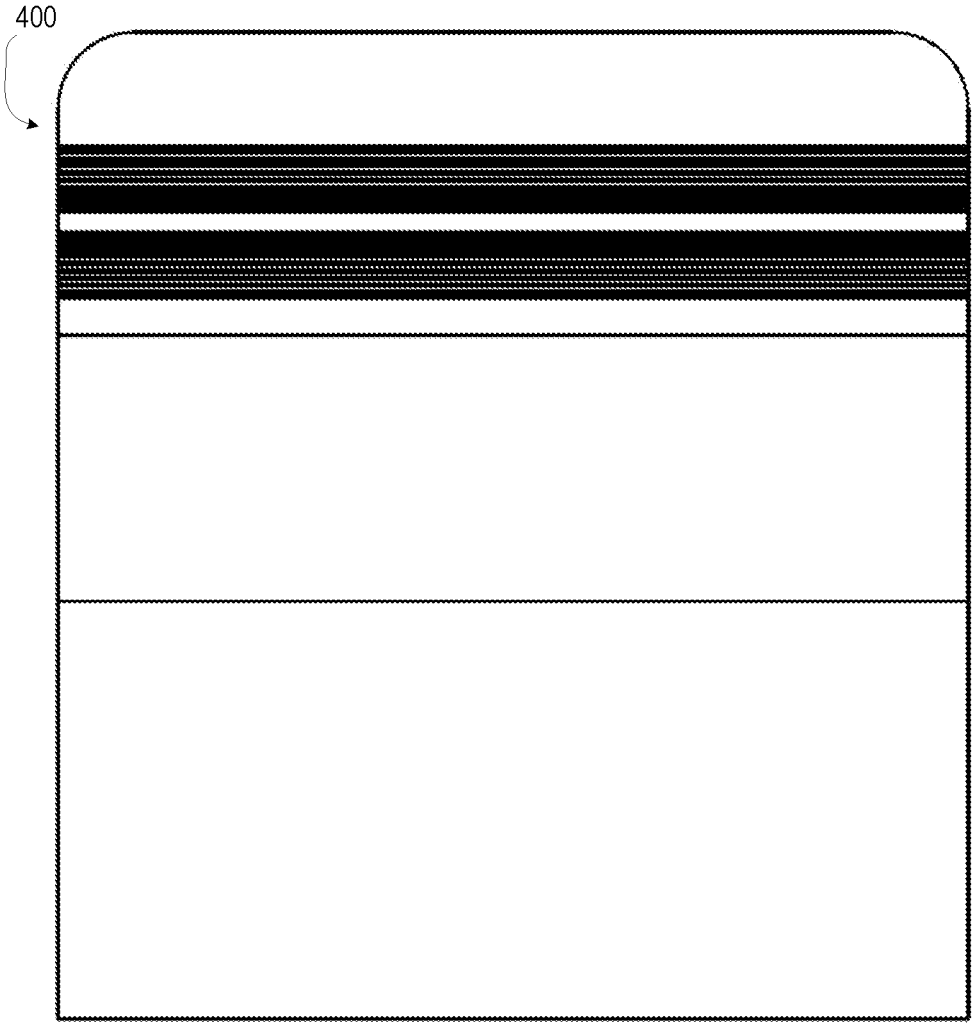
FIG. 4C illustrates a top view of the fourth example scoop of FIG. 4A, according to one or more embodiments.
Figure 4D:
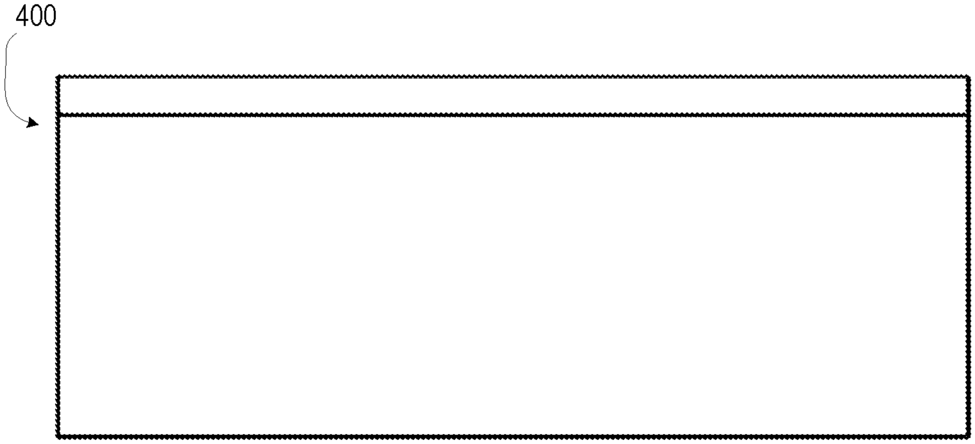
FIG. 4D illustrates a front view of the fourth example scoop of FIG. 4A, according to one or more embodiments.

FIG. 4A illustrates a three-dimensional view of a fourth example scoop 400 having right and left laterally openings 402, 403 of a transverse channel ("half-pipe") 404 with a larger radius of 0.88 inch and a tray 406 having a narrower width 3.0 inches. FIG. 4B illustrates a right-side view of the fourth example scoop 400. FIG. 4C illustrates a top view of the fourth example scoop of 400. FIG. 4D illustrates a front view of the fourth example scoop of 400. Except for the change in dimensions, the fourth example scoop 400 is similar to third scoop 300 (FIGS. 3A-3D).

Figure 5A:
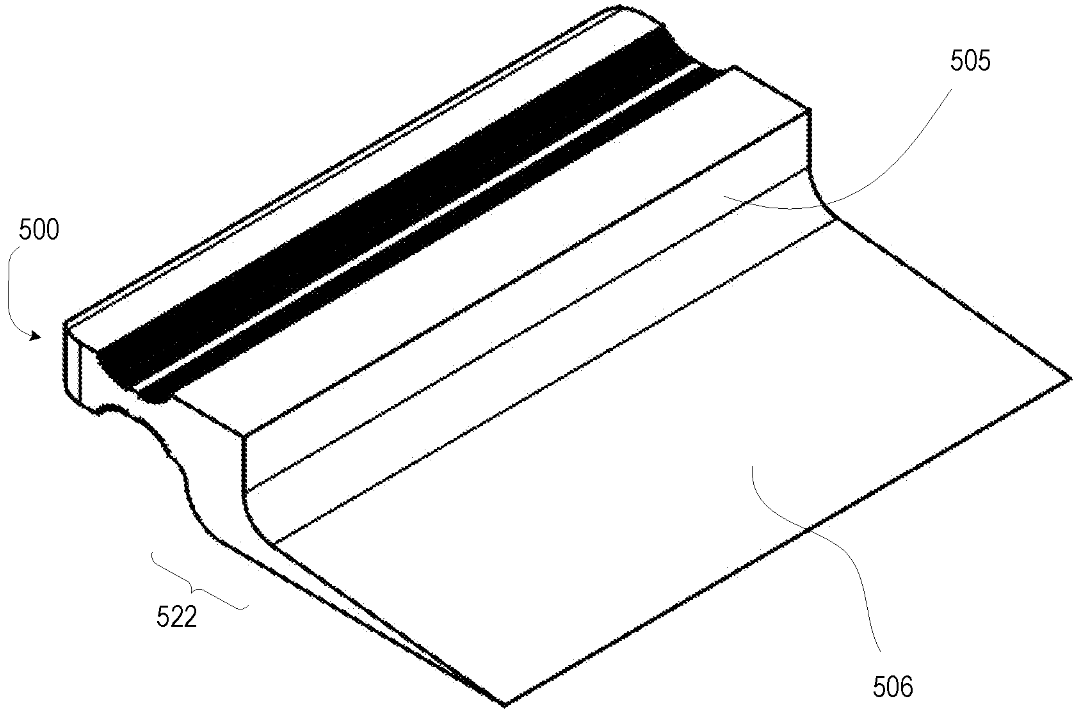
FIG. 5A illustrates a three-dimensional view of a fifth example scoop having a laterally open and upwardly open backstop, according to one or more embodiments.
Figure 5B:
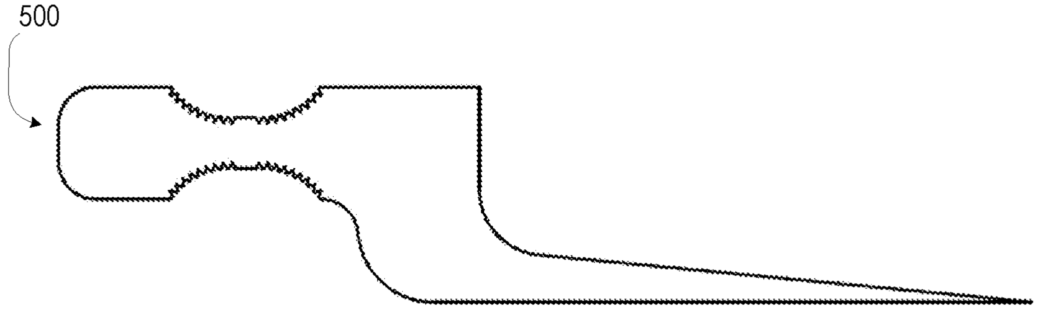
FIG. 5B illustrates a right-side view of the fifth example scoop of FIG. 5A, according to one or more embodiments.
Figure 5C:
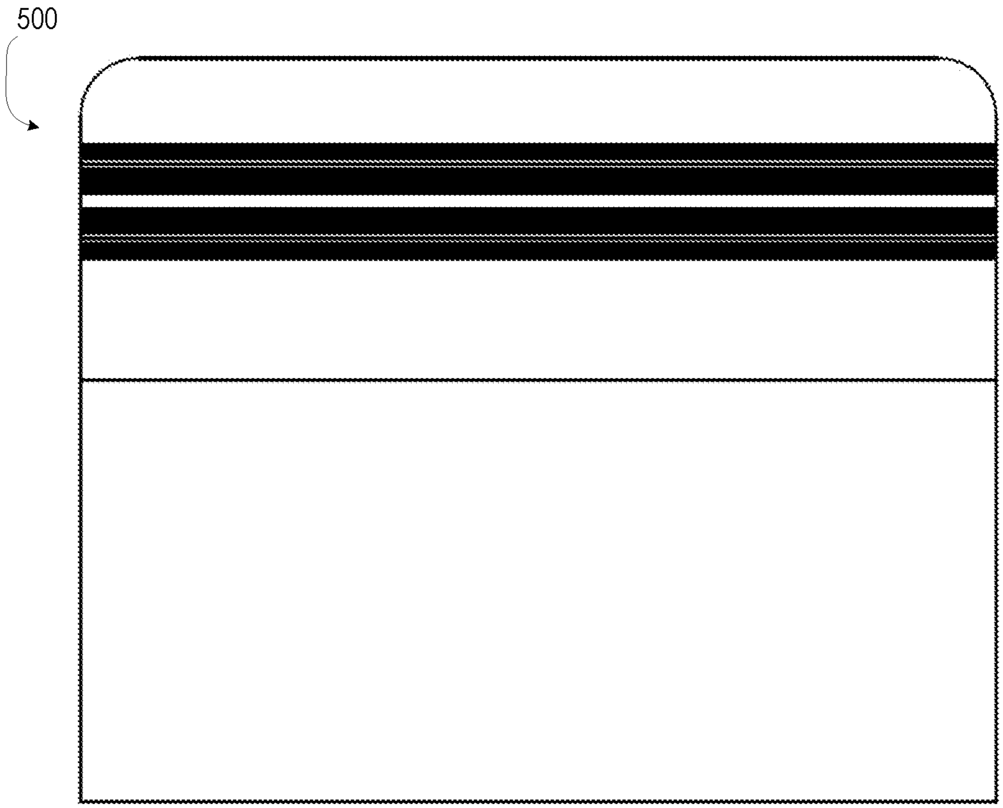
FIG. 5C illustrates a top view of the fifth example scoop of FIG. 5A, according to one or more embodiments.
Figure 5D:
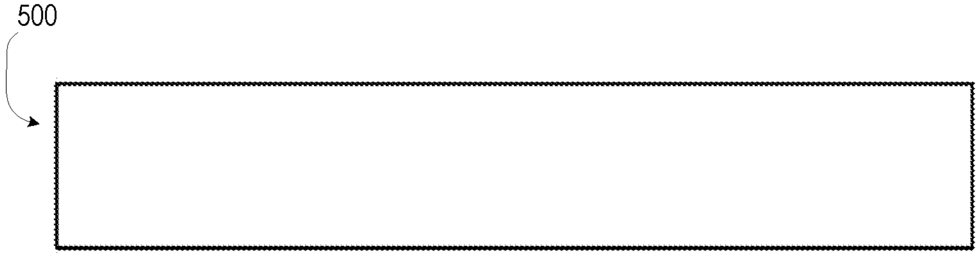
FIG. 5D illustrates a front view of the fifth example scoop of FIG. 5A, according to one or more embodiments.

FIG. 5A illustrates a three-dimensional view of a fifth example scoop 500 having a laterally open and upwardly open backstop 505. The tray 506 has a width 4.0 inches. FIG. 5B illustrates a right-side view of the fifth example scoop 500. FIG. 5C illustrates a top view of the fifth example scoop 500. FIG. 5D illustrates a front view of the fifth example scoop 500. Top portion 522 of the tray 506 does not include a top plate portion. Otherwise, the fifth example scoop 500 is similar to third scoop 300 (FIGS. 3A-3D).

Figure 6A:
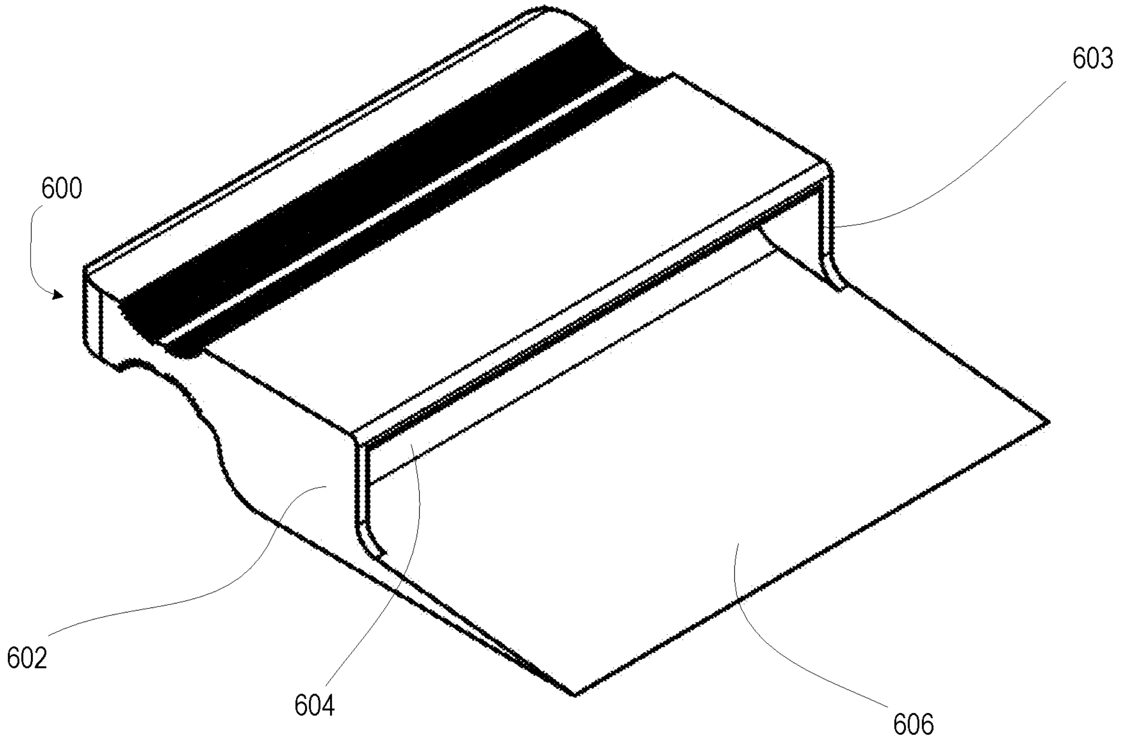
FIG. 6A illustrates a three-dimensional view of a sixth example scoop having a laterally closed transverse channel and a shallow inclined tray, according to one or more embodiments.
Figure 6B:
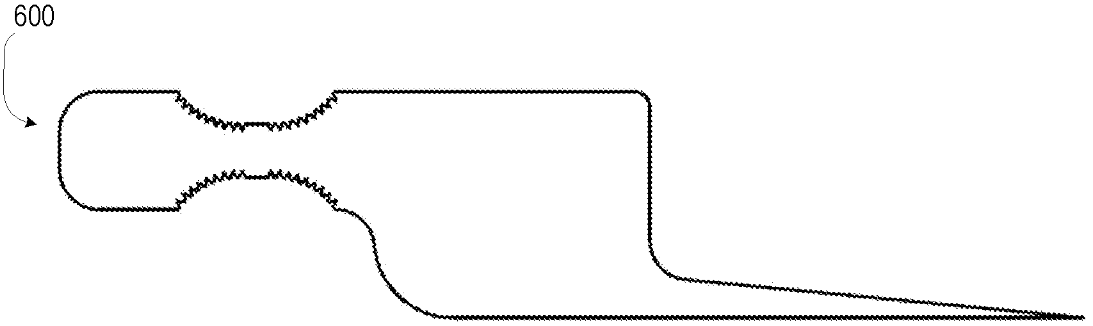
FIG. 6B illustrates a right-side view of the sixth example scoop of FIG. 6A, according to one or more embodiments.
Figure 6C:
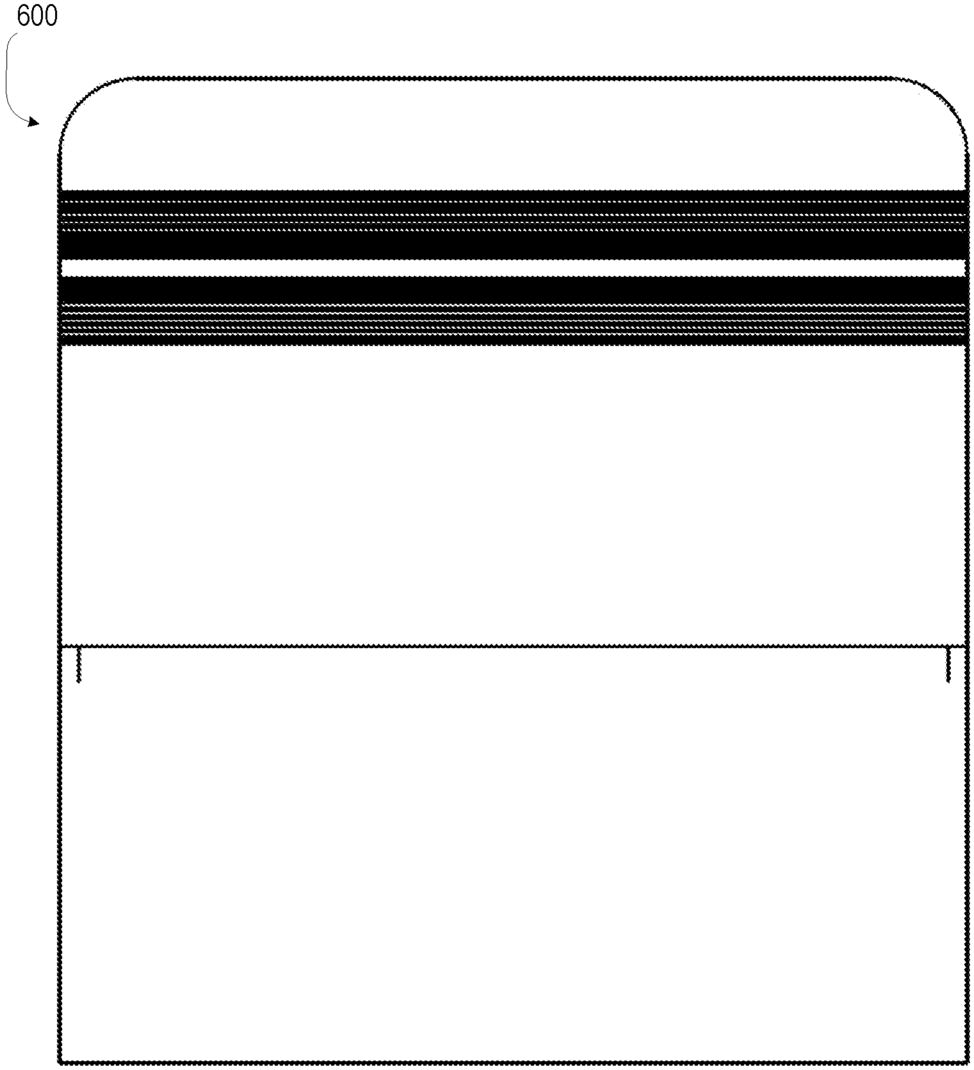
FIG. 6C illustrates a top view of the sixth example scoop of FIG. 6A, according to one or more embodiments.
Figure 6D:
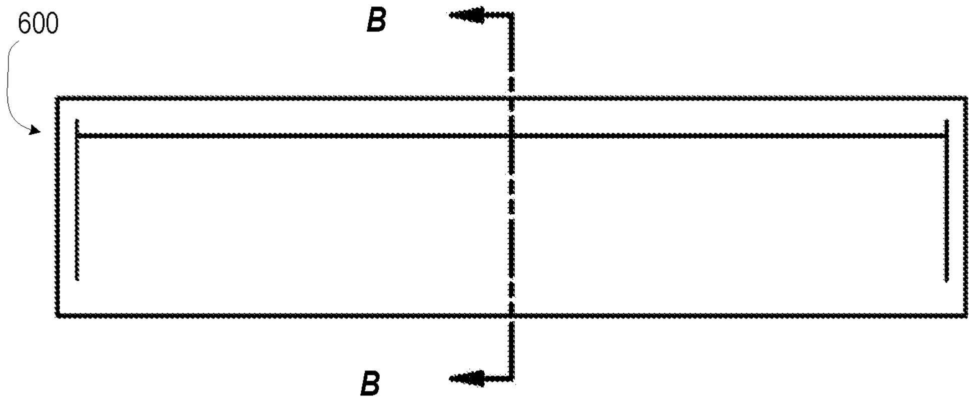
FIG. 6D illustrates a front view of the sixth example scoop of FIG. 6A, according to one or more embodiments.
Figure 6E:
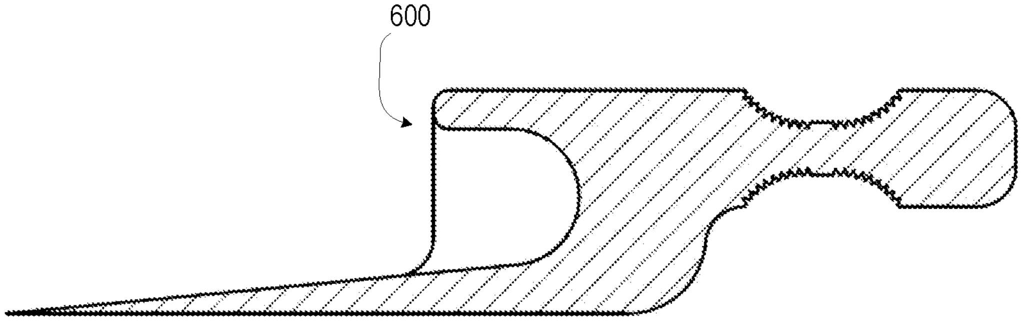
FIG. 6E illustrates a left-side view of the sixth example scoop of FIG. 6D cutaway along lines B-B, according to one or more embodiments.

FIG. 6A illustrates a three-dimensional view of a sixth example scoop 600 having right and left lateral sides 602, 603 that close a transverse channel 604. The sixth example scoop 600 has a shallow inclined tray 606 of width 3.0 inches. FIG. 6B illustrates a right-side view of the sixth example scoop 600. FIG. 6C illustrates a top view of the sixth example scoop 600. FIG. 6D illustrates a front view of the sixth example scoop 600. FIG. 6E illustrates a left-side view of the sixth example scoop 600 cutaway along lines B-B. Except for having closed right and left lateral sides 602, 603, the sixth example scoop 600 is similar to second scoop 200 (FIGS. 2A-2E). The sixth example scoop 600 can hold material in transverse channel 604 without spilling out of either lateral side. To dispense, however, the sixth example scoop 600 is limited to pouring the contents back over a straight beveled edge 620. The shallow incline of the tray 606 can provide enhanced flexibility to follow an uneven surface.

Figure 7A:
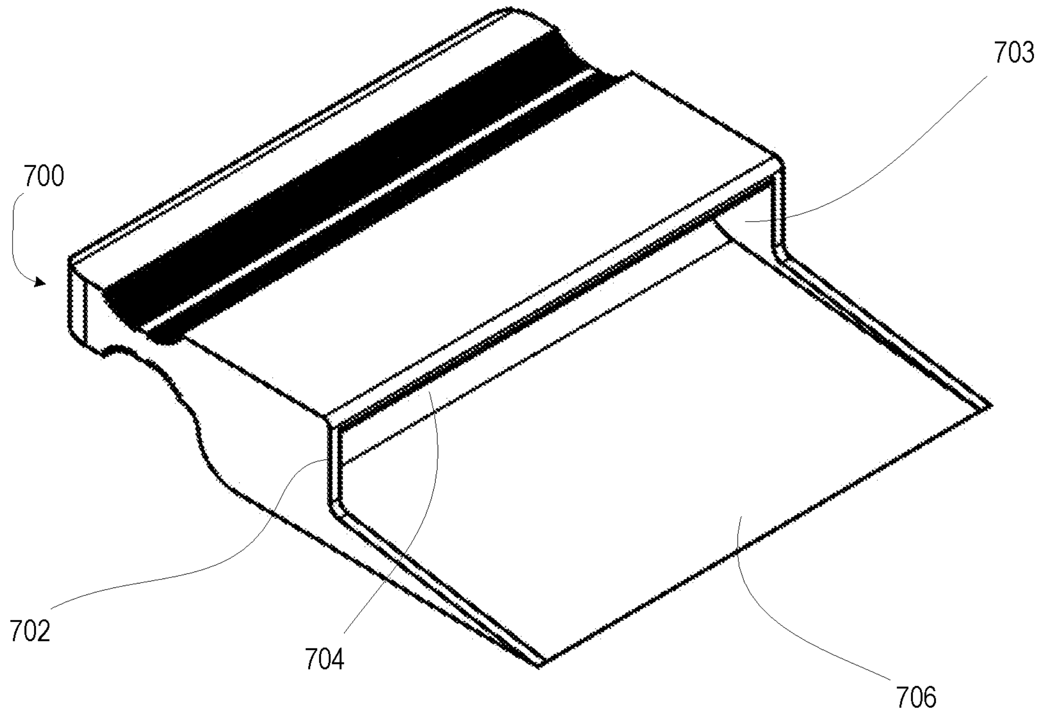
FIG. 7A illustrates a three-dimensional view of a seventh example scoop having a laterally closed transverse channel ("half-pipe") with a steep inclined tray, according to one or more embodiments.
Figure 7B:
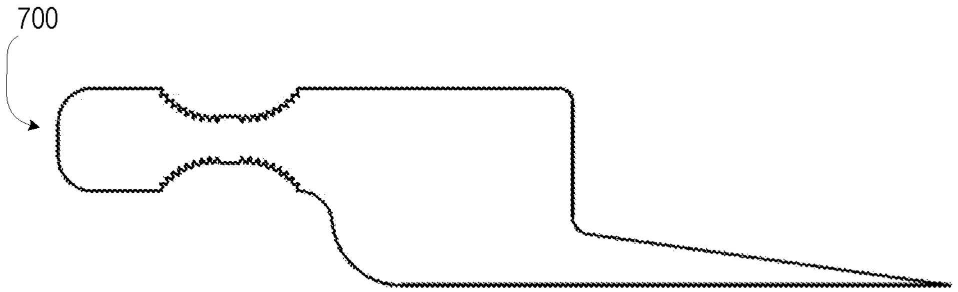
FIG. 7B illustrates a right-side view of the seventh example scoop of FIG. 7A, according to one or more embodiments.
Figure 7C:
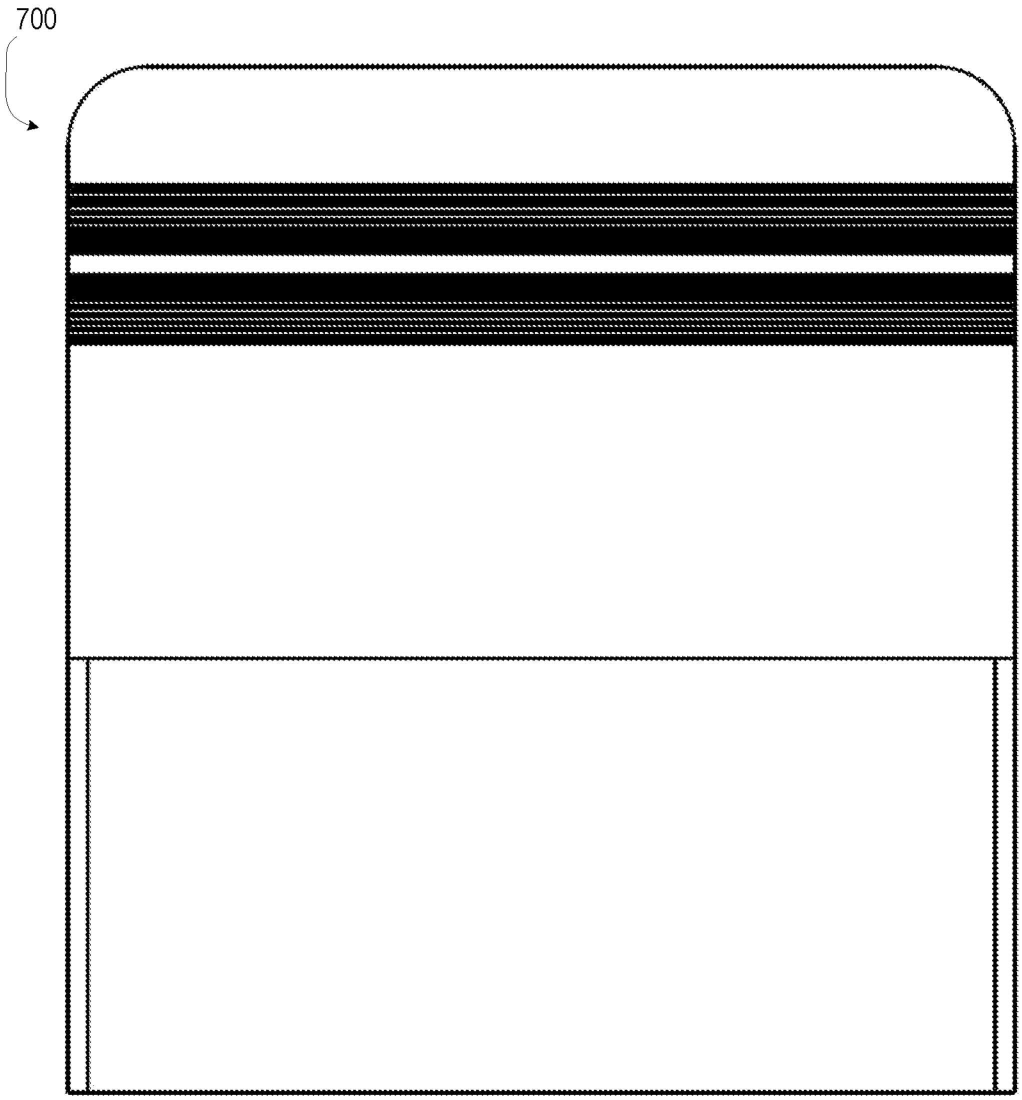
FIG. 7C illustrates a top view of the seventh example scoop of FIG. 7A, according to one or more embodiments.
Figure 7D:
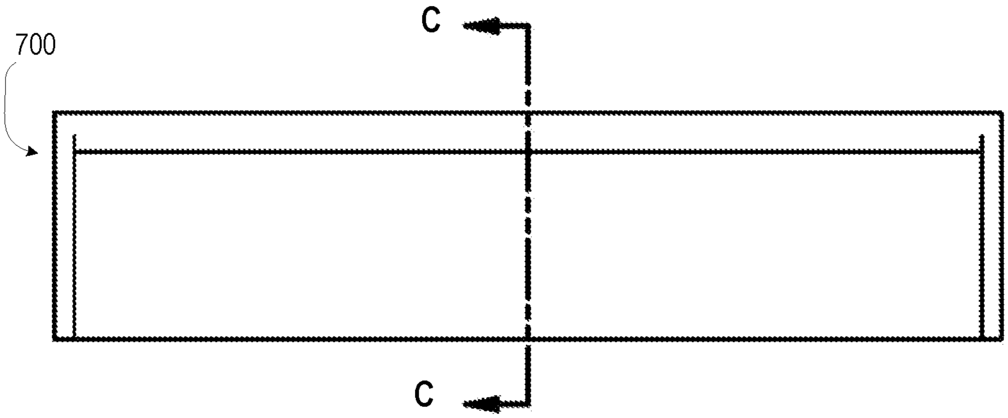
FIG. 7D illustrates a front view of the seventh example scoop of FIG. 7A, according to one or more embodiments.
Figure 7E:
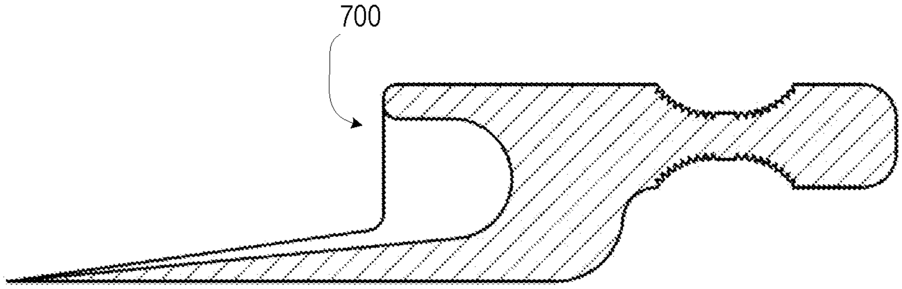
FIG. 7E illustrates a left-side view of the seventh example scoop of FIG. 7D cutaway along lines C-C, according to one or more embodiments.

FIG. 7A illustrates a three-dimensional view of a seventh example scoop 700 having right and left lateral sides 702, 703 that close a transverse channel 704. The seventh example scoop 700 has a tray 706 with a steep (raised) inclined tray 706 that has a width of 3.00 inches. The steeper incline can provide a stronger tray 706 to withstand damage. FIG. 7B illustrates a right-side view of the seventh example scoop 700. FIG. 7C illustrates a top view of the seventh example scoop 700. FIG. 7D illustrates a front view of the seventh example scoop 700. FIG. 7E illustrates a left-side view of the seventh example scoop 700 cutaway along lines C-C. Except for the raised incline of tray 706, the seventh example scoop 700 is similar to sixth scoop 600 (FIGS. 6A-6D).

The scoop 100 and other portions of the device can be made of plastics, resins, composites, metals, ceramics, rubbers, wood, or any combination thereof. The plastics specifically include polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof.

The scoop of the present invention may also incorporation an antistatic agent. Here, the substrate or the outer surface layer, or both of them may contain an antistatic agent, and/or may comprise a layer containing an antistatic agent; and/or other layers may contain an antistatic agent. For example, a functional layer, a release layer, and the like may be incorporated that may contain an antistatic agent. The antistatic surface may be a layer containing an antistatic agent. As the antistatic agent, a conventionally known antistatic agent can be used. Examples thereof may include various surfactant-type antistatic agents, such as various cationic antistatic agents having cationic groups such as a quaternary ammonium salt group, a pyridinium salt group, and primary to tertiary amino groups; anionic antistatic agents having anionic groups such as a sulfonic acid salt group, a sulfate ester salt group, a phosphate ester salt group, and a phosphonate salt group; amino acid-based and aminosulfate-based amphoteric antistatic agents; and amino alcohol-based, glycerin-based, and polyethylene glycol-based nonionic antistatic agents.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A scoop comprising:

a tray comprising a bottom portion having a flat bottom surface and an inclined top surface that distally terminate in a straight beveled edge that has a width that is smaller than a smoking outer wrap, the inclined top surface proximally transitioning to a top portion comprising a transverse channel, the transverse channel having a backstop portion and top panel portion, the transverse channel at least partially open on one lateral end; and a gripping portion attached to, and extending proximally from, the tray, wherein the gripping portion comprises a rectangular block attached across a width of the tray, the rectangular block comprising opposing transverse grooved recesses on a top surface and a bottom surface, the gripping portion enabling a user to: (i) position the straight beveled edge against a surface for scraping smoking material onto the tray; (ii) upwardly tip the tray to collect the scraped smoking material into the transverse channel; and (iii) to selectively dispense the collected smoking material either through the at least partially open lateral end of the transverse channel or back over the straight beveled edge.

2. The scoop of claim 1, wherein the straight beveled edge has width that is in a range of 3-4 inches.

3. The scoop of claim 1, wherein the transverse channel has an opening on at least one lateral side that is defined by an upper inclined surface, the backstop portion, and the top panel.

4. The scoop of claim 1, wherein the transverse channel has an opening on at least one lateral side that is defined by a dispensing funnel.

5. The scoop of claim 1, wherein the transverse channel comprises a cylindrical recess.

6. The scoop of claim 5, wherein the cylindrical recess has a radius within a range of 0.44 to 0.88 inch.

7. The scoop of claim 1, wherein the transverse channel comprises a rectangular recess.

8. The scoop of claim 1, wherein one lateral end of the transverse channel is at least partially open and another lateral end of the transverse channel is closed.

9. The scoop of claim 1, wherein both lateral ends of the transverse channel are open.

10. A scoop comprising:

a tray comprising a bottom portion having a flat bottom surface and an inclined top surface that distally terminate in a straight beveled edge that has a width that is smaller than a smoking outer wrap, the inclined top surface proximally transitioning to a top portion comprising a transverse channel, the transverse channel having a backstop portion, the transverse channel closed on each lateral end; and a gripping portion attached to, and extending proximally from, the tray, wherein the gripping portion comprises a rectangular block attached across a width of the tray, the rectangular block comprising opposing transverse grooved recesses on a top surface and a bottom surface, the gripping portion enabling a user to: (i) position the straight beveled edge against a surface for scraping smoking material onto the tray; (ii) upwardly tip the tray to collect the scraped smoking material into the transverse channel; and (iii) to dispense the collected smoking material back over the straight beveled edge.

11. A scoop comprising:

a tray comprising a bottom portion having a flat bottom surface and an inclined top surface that distally terminate in a straight beveled edge that has a width that is smaller than a smoking outer wrap, the inclined top surface proximally transitioning to a backstop portion; and a gripping portion attached to, and extending proximally from, the tray, wherein the gripping portion comprises a rectangular block attached across a width of the tray, the rectangular block comprising opposing transverse grooved recesses on a top surface and a bottom surface, the gripping portion enabling a user to: (i) position the straight beveled edge against a surface for scraping smoking material onto the tray; (ii) upwardly tip the tray to collect the scraped smoking material into the transverse channel; and (iii) to selectively dispense the collected smoking material either off of a selected lateral side or back over the straight beveled edge.

* * * * *